Patented Dec. 31, 1946

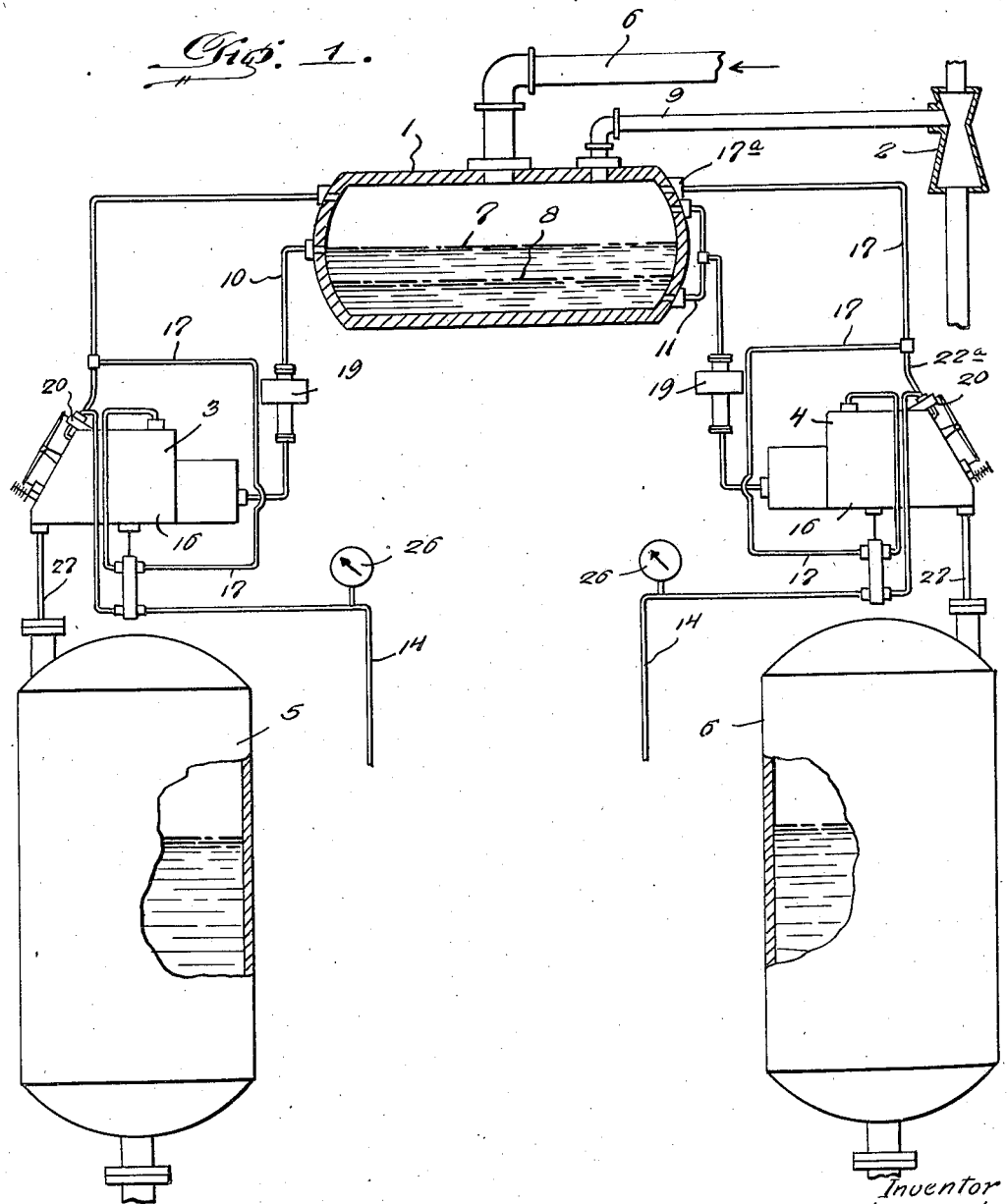

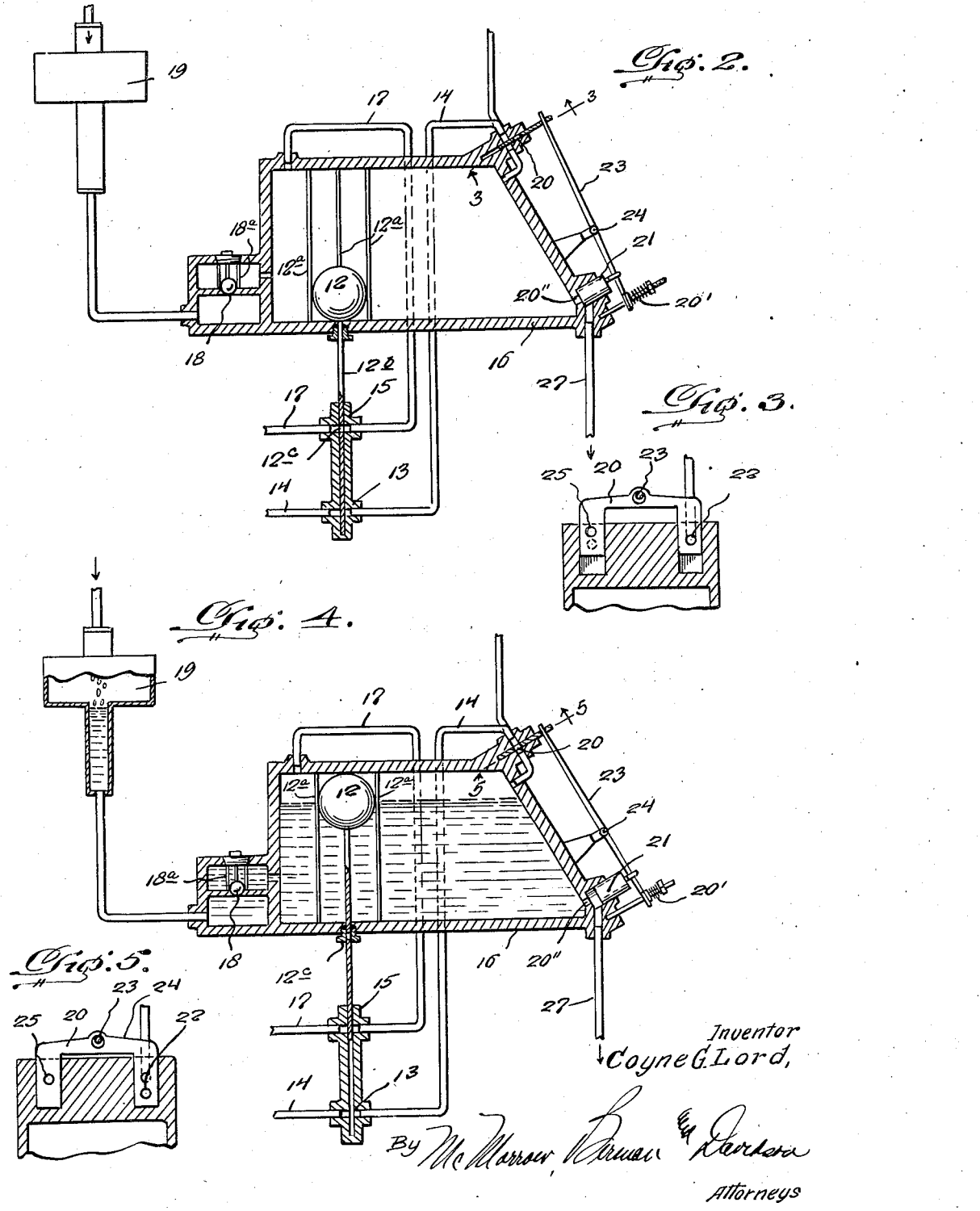

2,413,509

UNITED STATES PATENT OFFICE 2,413,509

LIQUID SEPARATOR TANK HAVING MEANS FOR DRAWING A VACUUM ON THE TANK AND HAVING DISCHARGE MECHANISMS FOR CAUSING A FLOW OF LIQUID THERETO FROM THE SEPARATOR TANK

Coyne G. Lord, Wilmington, Del.

Application September 18, 1945, Serial No. 617,054

6 Claims. (Cl. 210—51)

This invention relates to the separation of immiscible liquids having different densities and more particularly to a method and apparatus therefor.

It is the object of this invention to provide a continuously operating separator for automatically receiving immiscible liquids and discharging the separated components thereof.

The invention will be better understood from the following detailed description thereof with reference to the following drawings in which:

Figure 1 is a frontal elevation of the separator partly in cross-section,

Figure 2 is a detailed cross-sectional view of the discharge mechanism,

Figure 3 is a detailed view in section along line 3—3 of Figure 2,

Figure 4 is a cross-sectional detailed view of the discharge mechanism when filled with liquid, Figure 5 is a detailed view in section along line 5—5 of Figure 4.

The separating mechanism of this invention comprises, broadly, a receiving tank 1, a steam vacuum creator 2 for maintaining a high vacuum in tank 1, separate discharge mechanisms 3 and 4 for each liquid and separate storage tanks 5 and 6 for each liquid.

Liquids enter tank 1 from pipe 6 and being immiscible separate into two layers 7 and 8. A vacuum is drawn on tank 1 by vacuum creator 2 through vacuum pipe 9.

Eventually top layer 7 will flow into outlet pipe 10 while the bottom layer 8 will flow into the outlet pipe 11, the liquids passing to the identical discharge mechanisms 3 and 4 respectively. From discharge mechanisms 3 and 4 the liquid is allowed to flow into tanks 5 and 6 respectively, where the air pressure is atmospheric.

The operation of discharge mechanisms 3 and 4 will be described with reference to 3 only since both are alike.

At the start of the cycle of operation the discharge mechanism 3 is empty with float 12, which is vertically movable in guide rods 12a, resting on the bottom in a position closing, by means of float rod 12b, the inlet air valve 13; which controls atmospheric air from inlet 14, and at the same time opening inlet vacuum valve 15 by placing float rod passageway 12c opposite vacuum line 17. The inlet vacuum valve 15 will then cause a vacuum to be drawn on discharge tank 16 through vacuum line 17 which is connected to tank 1 at 17a. Thus the discharge mechanism is under the same vacuum as the rest of the system, and as soon as tank 1 starts discharging liquid it will flow into the discharge mechanism 3 through the ball check valve 18, which is vertically movable in check valve guide rods 18a, and the discharging liquid will be visible in sightglass 19 flowing from tank 1.

As the discharge mechanism 3 fills up the liquid will cause the float 12 to rise with it, turning off vacuum valve 15 and opening air valve 13. As yet, of course, the air cannot enter the discharge tank 16 since it is stopped by valve 20.

As the discharge tank 3 reaches a full stage, the float 12 reaches the top of the discharge tank 3. At this point the liquid height in the sight glass 19 will build up until its hydrostatic pressure is in excess of the tension of the spring 20' adjacent the inside end of stem 20'' of discharge valve 21.

At this point the float 12 is up causing vacuum inlet valve 15 to be in a closed position and air inlet valve 13 to be in an open position. Adjustments of spring 20' can cause the filling up process to cease at any desired point. At this point the valve 21 is forced open, this opening motion closing at the same time vacuum valve port 22, leading to vacuum line 22a, by means of arm 23 and U-shaped rocker-seat 24, and opening the air inlet valve port 25, which latter is connected to air line 14, the air line having an adjustable pressure air source, not shown, for varying the rate of liquid discharge from tank 3 depending on the air pressure in line 14 as measured by gauge 26.

As the liquid is discharged through valve 21 and line 27 to tank 5 the float 12 drops closing air inlet valve 13, opening vacuum valve 15. Check valve 18 prevents pressure from building up in the rest of the system while the discharge mechanism 3 is discharging.

With the vacuum inlet valve 15 open, the pressure within the tank 16 drops below atmospheric, thereby causing valve 21 to close itself.

While the discharge system is emptying itself, any material discharged from tank 1 is allowed to build up in sight glass 19 as seen in Figure 4.

The vacuum valves 15 and 22 continue open until the pressure in tank 16 once more is as low as the pressure in the remainder of the system; then check valve 18 opens and the cycle is automatically repeated.

Before operation, two settings are necessary: the tension on valve 21 should be such that the sight glass 19 fills partly full to any desired height, and the air pressure entering line 14 should be set to adjust the discharge rate.

I claim:

1. A separator for a plurality of immiscible liquids comprising a receiving tank, means for drawing a vacuum on said receiving tank, and discharge mechanisms which are so constructed as to remove each of said liquids from said receiving tank for delivery to any desired point, said discharge mechanisms comprising discharge tanks, means for drawing a vacuum on said discharge tanks for causing flow of liquid thereto, discharge valves on said discharge tanks for delivery of liquid therefrom, inlet air supply sources, inlet air valve means for allowing air to pass into said discharge tanks for permitting liquid to flow therefrom, means opening said inlet air valve as the liquid level in said discharge tanks reaches a predetermined elevation, and check valves between said discharge tanks and said receiving tank.

2. A separator for a plurality of immiscible liquids comprising a receiving tank, means for drawing a vacuum on said receiving tank, and discharge mechanisms which are so constructed as to remove each of said liquids from said receiving tank for delivery to any desired point, said discharge mechanisms comprising discharge tanks, means for drawing a vacuum on said discharge tanks for causing flow of liquid thereto, discharge valves on said discharge tanks for delivery of liquid therefrom, inlet air supply sources, inlet air valve means for allowing air to pass into said discharge tanks for permitting liquid to flow therefrom, means opening said inlet air valve as the liquid level in said discharge tanks reaches a predetermined elevation, check valves between said discharge tanks and said receiving tank, said discharge mechanisms being automatic and being so constructed as to automatically receive liquids from said receiving tank and to discharge the said liquids at desired points.

3. A separator for a plurality of immiscible liquids comprising a receiving tank, means for drawing a vacuum on said receiving tank, and discharge mechanisms which are so constructed as to remove each of said liquids from said receiving tank for delivery to any desired point, said discharge mechanisms comprising discharge tanks, means for drawing a vacuum on said discharge tanks for causing flow of liquid from said receiving tank thereto, discharge valves on said discharge tanks for delivery of liquid therefrom, inlet air supply sources, inlet air valve means for allowing air to pass into said discharge tanks for permitting liquid to flow therefrom, check valves between said discharge tanks and said receiving tank, said discharge mechanisms being automatic and being so constructed as to automatically receive liquids from said receiving tank and to discharge the said liquids at desired points, said inlet air valve means each comprising an air line valve and an air inlet valve and said discharge tank vacuum drawing means each comprising a vacuum source, a vacuum line valve and a vacuum inlet valve, said air line and vacuum line valves being actuated by a means responsive to the height of liquid in said discharge tank, said air and vacuum inlet valves being actuated by a means responsive to pressures in each of said discharge tanks.

4. A separator for a plurality of immiscible liquids comprising a receiving tank, means for drawing a vacuum on said receiving tank, and discharge mechanisms which are so constructed as to remove each of said liquids from said receiving tank for delivery to any desired point, said discharge mechanisms comprising discharge tanks, means for drawing a vacuum on said discharge tanks for causing flow of liquid from said receiving tank thereto, discharge valves on said discharge tanks for delivery of liquid therefrom, inlet air supply sources, inlet air valve means for allowing air to pass into said discharge tanks for permitting liquid to flow therefrom, check valves between said discharge tanks and said receiving tank, said discharge mechanisms being automatic and being so constructed as to automatically receive liquids from said receiving tank and to discharge the said liquids at desired points, said inlet air valve means each comprising an air line valve and an air inlet valve and said discharge tank vacuum drawing means each comprising a vacuum source, a vacuum line valve and a vacuum inlet valve, said air line and vacuum line valves being actuated by a means responsive to the height of liquid in said discharge tank, said air and vacuum inlet valves being actuated by a means responsive to pressures in each of said discharge tanks, said discharge tank discharge valves being actuable responsive to the respective pressures in each of said discharge tanks, said means responsive to the height of liquid in said discharge tank being a float valve.

5. A separator for a plurality of immiscible liquids comprising a receiving tank, means for drawing a vacuum on said receiving tank, and discharge mechanisms which are so constructed as to remove each of said liquids from said receiving tank for delivery to any desired point, said discharge mechanisms comprising discharge tanks, means for drawing a vacuum on said discharge tanks for causing flow of liquid from said receiving tank thereto, discharge valves on said discharge tanks for delivery of liquid therefrom, inlet air supply sources, inlet air valve means for allowing air to pass into said discharge tanks for permitting liquid to flow therefrom, check valves between said discharge tanks and said receiving tank, said discharge mechanisms being automatic and being so constructed as to automatically receive liquids from said receiving tank and to discharge the said liquids at desired points, said inlet air valve means each comprising an air line valve and an air inlet valve and said discharge tank vacuum drawing means each comprising a vacuum source, a vacuum line valve and a vacuum inlet valve, said air line and vacuum line valves being actuated by a means responsive to the height of liquid in said discharge tank, said means responsive to the height of liquid in said discharge tank being a float valve, said means responsive to pressures in each of said discharge tanks being a discharge valve comprising a valve stem and a spring, said valve stem being in a position such that liquid pressure in the said discharge tank tends to open the said discharge valve and the pressure of said spring tends to close the said discharge valve.

6. A separator for a plurality of immiscible liquids comprising a receiving tank, means for drawing a vacuum on said receiving tank, and discharge mechanisms which are so constructed as to remove each of said liquids from said receiving tank for delivery to any desired point, said discharge mechanisms comprising discharge tanks, means for drawing a vacuum on said discharge tanks for causing flow of liquid from said receiving tank thereto, discharge valves on said discharge tanks for delivery of liquid therefrom, inlet air supply sources, inlet air valve means for allowing air to pass into said discharge tanks for permitting liquid to flow therefrom, check valves between said discharge tanks and said receiving tank, said discharge mechanisms being automatic and being so constructed as to automatically receive liquids from said receiving tank and to discharge the said liquids at desired points, said inlet air valve means each comprising an air line valve and an air inlet valve and said discharge tank vacuum drawing means each comprising a vacuum source, a vacuum line valve and a vacuum inlet valve, said air line and vacuum line valves being actuated by a means responsive to the height of liquid in said discharge tank, said air and vacuum inlet valves being actuated by a means responsive to pressures in each of said discharge tanks, said discharge tank discharge valves being actuable responsive to the respective pressures in each of said discharge tanks, said means responsive to the height of liquid in said discharge tank being a float valve, said discharge valve stem having an arm attached thereto, said arm being pivotally mounted at a midpoint between the ends thereof, the end of said arm opposite that end of said arm which is attached to a means for opening, first, the said vacuum inlet valve to said discharge tank at the same time closing said air inlet valve to said discharge tank, and then later opening said air inlet valve while at the same time closing said vacuum inlet valve.

COYNE G. LORD.